United States Patent [19]
Yanagita et al.

[11] Patent Number: 5,968,471
[45] Date of Patent: Oct. 19, 1999

[54] PROCESS FOR PRODUCING MOLECULAR SIEVE CARBON

[75] Inventors: Katsuyoshi Yanagita; Masayoshi Hayashida, both of Yamanashi, Japan

[73] Assignee: Nippon Sanso Corporation, Tokyo, Japan

[21] Appl. No.: 08/809,171

[22] PCT Filed: Jul. 20, 1995

[86] PCT No.: PCT/JP95/01441

§ 371 Date: Mar. 18, 1997

§ 102(e) Date: Mar. 18, 1997

[87] PCT Pub. No.: WO97/03923

PCT Pub. Date: Feb. 6, 1997

[51] Int. Cl.⁶ .................................................. C01B 31/00
[52] U.S. Cl. .................... 423/445 R; 502/180; 502/434
[58] Field of Search .................. 423/445 R; 502/434, 502/180; 264/29.6, 29.7, 83

[56] References Cited

U.S. PATENT DOCUMENTS

| | | | |
|---|---|---|---|
| 3,801,513 | 4/1974 | Munzner et al. ...................... | 502/432 |
| 3,953,345 | 4/1976 | Saito et al. ............................... | 252/423 |
| 4,489,132 | 12/1984 | Shimayoma .............................. | 23/314 |
| 4,832,881 | 5/1989 | Arnold, Jr. et al. ..................... | 264/29.7 |
| 5,059,578 | 10/1991 | Manmo et al. .......................... | 502/432 |
| 5,272,126 | 12/1993 | Ichikawa et al. ........................ | 502/429 |
| 5,447,557 | 9/1995 | Golden et al. ........................... | 423/219 |

FOREIGN PATENT DOCUMENTS

| | | |
|---|---|---|
| 0 626 199 | 11/1994 | European Pat. Off. . |
| 40 41 580 A1 | 4/1992 | Germany . |
| 50-8794 | 1/1975 | Japan . |
| 59-064511 | 7/1984 | Japan . |
| 59-230637 | 12/1984 | Japan . |
| 5-508107 | 11/1993 | Japan . |
| 7-48112 | 2/1995 | Japan . |
| WO 92/05868 | 4/1992 | WIPO . |

*Primary Examiner*—Steven Bos
*Assistant Examiner*—Stuart L. Hendrickson
*Attorney, Agent, or Firm*—Armstrong, Westerman, Hattori, McLeland & Naughton

[57] ABSTRACT

A process for producing a molecular sieve carbon, which comprises subjecting a cured product obtained by curing a raw material thermosetting resin to heat oxidation; pulverizing the oxidized product formed after the heat oxidation treatment; granulating the resulting pulverized product; subjecting the resulting granule to carbonization; subjecting the carbonized charcoal obtained in the carbonizing step to heat treatment; and adjusting the pore size of the heat-treated carbonized charcoal.

10 Claims, 2 Drawing Sheets

5,968,471

PROCESS FOR PRODUCING MOLECULAR SIEVE CARBON

TECHNICAL FIELD

The present invention relates to a process for producing a molecular sieve carbon made from a thermosetting resin.

TECHNICAL BACKGROUND

There is known a molecular sieve carbon (hereinafter referred to as MSC), for example, as an adsorbent for separating air into oxygen and nitrogen. This MSC is produced using a carbonized charcoal prepared by carbonization of, for example, a carbon material such as cokes, coal and coconut shell char or of thermosetting resins such as phenol resins. It should be noted here that carbonization treatment is to subject a cured thermosetting resin to dry distillation to volatilize components other than carbon.

FIG. 1 shows an example of prior art process for producing an MSC using a thermosetting resin.

A starting material thermosetting resin 1 is cured in a curing step S1 to obtain a cured resin 2, which is then subjected to dry distillation in a dry distillation step S2 to obtain a dry distillate 3. Subsequently, the dry distillate 3 is pulverized in a pulverizing step S3 over an ordinary pulverizer such as a ball mill to provide a pulverized product (primary particles) 4, and the pulverized product 4 is admixed with a binder to be granulated in a granulating step S4 to obtain a granule 5. The granule 5 is further subjected to carbonization in a carbonizing step S5 to provide a carbonized charcoal 6. The carbonized charcoal 6 is then subjected to heat treatment in a heat treatment step S6 and then to pore size adjustment and the like in a pore adjustment step S7 to carry out adjustment of pore opening and the like to give an MSC 7.

Incidentally, it is possible to subject the cured resin 2 directly to the pulverizing treatment in the pulverizing step S3 without undergoing the dry distillation step S2.

Meanwhile, when a commercially available cured thermosetting resin powder 8 is employed as the raw material, the carbonized charcoal 6 can be obtained by subjecting the powder 8 directly to the granulating step S4 and then to carbonization in the carbonizing step S5 without undergoing the pulverizing step S3, since the raw material thermosetting resin already assumes a powder form. However, when a finely divided powder is to be formed, the pulverizing step S3 should not be omitted preferably, and, in this case, the powder 8 is subjected to dry distillation in the dry distillation step S2 to be converted into a distillate 3 which is then subjected to the pulverizing step S3.

In the process for producing an MSC as described above, the pulverizing step S3 is a significant step which determines the particle size and particle size distribution of the carbonized charcoal powder (primary particles) and influences much the performance of the MSC finally obtained.

However, in the conventional process employing an ordinary pulverizer such as a ball mill, although particles of 100 μm or less can be obtained in a short time (about one hour) at the initial stage of pulverization, the particle size cannot be further reduced easily and the particle size distribution is widened even if pulverization is continued for an extended time. Accordingly, the performance of the resulting MSC becomes poor, inconveniently.

DISCLOSURE OF THE INVENTION

It is an objective of the present invention to provide a process for producing a high-performance MSC having a small particle size and a narrow particle size distribution.

The process for producing a molecular sieve carbon according to the present invention contains a step of subjecting a cured product obtained by curing a raw material thermosetting resin to heat oxidation; a step of pulverizing the oxidized product formed after the heat oxidation treatment; a step of granulating the resulting pulverized product; a step of subjecting the resulting granule to carbonization; a step of subjecting the carbonized charcoal obtained in the carbonizing step to heat treatment; and a step of adjusting the pore size of the heat-treated carbonized charcoal.

While various kinds of thermosetting resins, for example, a phenol resin, a urea resin, a melamine resin, an epoxy resin, a urethane resin, a furan resin and an unsaturated polyester resin can be employed as the thermosetting resin, the phenol resin is most suitably employed as the raw material in view of ease of availability.

The heat oxidation treatment is to heat-treat the cured product of the thermosetting resin employed as the raw material in an ambient gas containing oxygen. Accordingly, while any desired gas may be employed so long as it contains oxygen, air is practically employed. In the case where air is employed as the ambient gas, the heating temperature is suitably 150 to 400° C., preferably 180 to 300° C. If the ambient temperature is lower than 150° C., heat oxidation treatment cannot be achieved sufficiently, leading to the failure of obtaining sufficient pulverizing effect in the subsequent pulverizing step. Meanwhile, if the ambient temperature is higher than 400° C., the cured resin is activated by oxygen during the heat oxidation treatment to induce unfavorable results for the MSC. If the oxygen concentration in the ambient gas is higher than in air, a lower ambient temperature is preferably employed, whereas if it is lower than in air, a higher ambient temperature is preferably employed.

The process for producing an MSC according to the present invention is substantially the same as that of the prior art except for the heat oxidation treatment. However, since the MSC obtained has a narrow particle size distribution and a small particle size compared with those of the prior art MSC, the MSC of the present invention shows high performance such as increased adsorption capacity, improved separating effect, etc. over the prior art MSC.

More specifically, in an adsorption separation of a gas using an MSC, it is considered to be preferred that primary particles (raw material powder) of the adsorbent generally have a small particle size and are of a uniform size. However, it is not practical to consume a long time for pulverization, which leads to increase in the pulverization cost, so as to obtain such primary particles. Accordingly, while the pulverizing step where properties of the primary particles are determined is very important among other steps in the process for producing an MSC, the pulverizing step is actually carried out taking it into consideration that the pulverization cost may not be increased very much.

As described above, when an MSC is to be prepared using a thermosetting resin such as a phenol resin as the raw material, by subjecting the resin raw material to heat oxidation prior to pulverization, finely divided primary particles having a uniform particle size can be obtained easily at a low pulverization cost using an ordinary universal pulverizer such as a ball mill. Consequently, an MSC having a high adsorption capacity and excellent separation performance can be obtained.

BEST MODE FOR CARRYING OUT THE INVENTION

Figure 1:
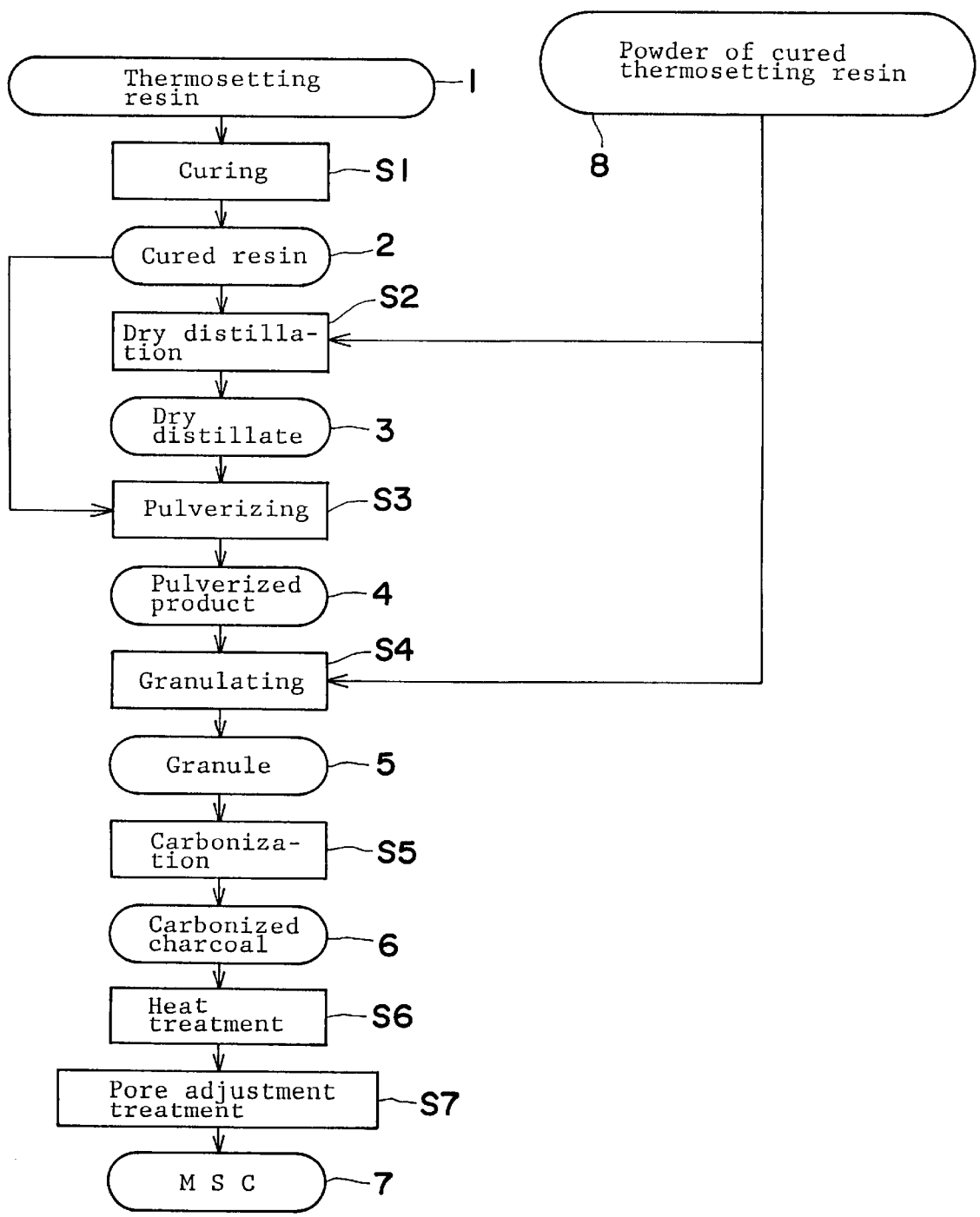
FIG. 1 is a flow chart showing an example of prior art process for producing an MSC.
Figure 2:
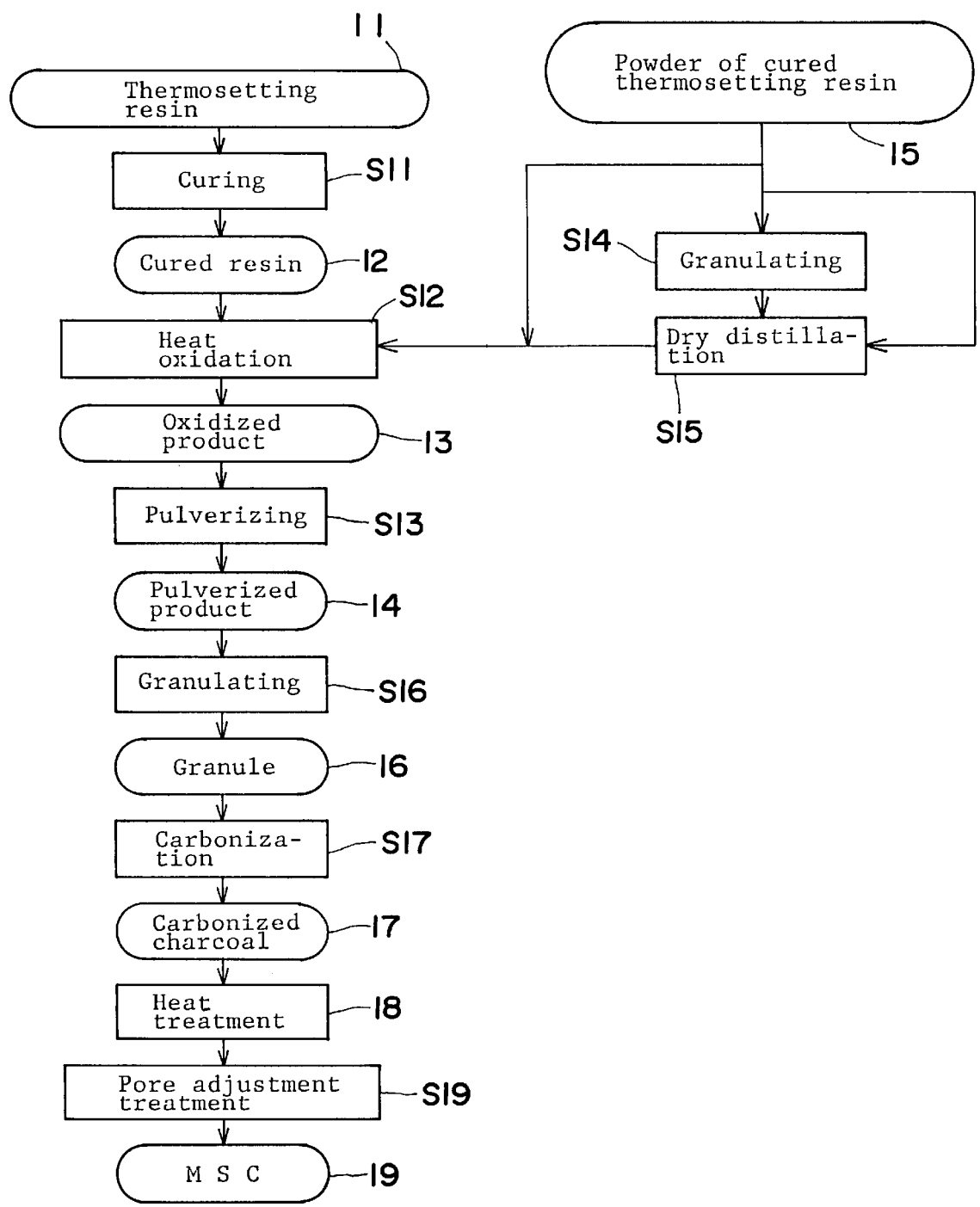
FIG. 2 is a flow chart showing an example of process for producing an MSC according to the present invention.

FIG. 2 shows an example of the process for producing an MSC according to the present invention employing a thermosetting resin as a raw material.

A raw material thermosetting resin 11 is cured in the same curing step S11 as in the prior art to provide a cured resin 12. The thus obtained cured resin 12 is brought into contact with oxygen in air heated to 150 to 400° C. in a heat oxidation step S12 to be heat-oxidized.

The resulting oxidized product 13 obtained in the heat oxidation step S12 is then pulverized in an ordinary pulverizer such as a ball mill to a desired particle size in a pulverizing step 13.

Meanwhile, in the case where a powder of cured thermosetting resin 15 is employed as the raw material, it may be directly subjected to heat oxidation treatment in the heat oxidation step S12. However, since it is difficult to carry out heat oxidation of the resin powder 15 as such, the resin 15 is subjected, prior to the heat oxidation step S12, to a granulation step S14 and a dry distillation step S15 by conventional procedures or to a dry distillation step S15 by conventional procedures. Otherwise, the heat oxidation step S12 is carried out after the resin 15 is subjected to dry distillation over a fluidized bed, or the heat oxidation step S12 can be carried out directly over the fluidized bed.

As described above, even if an ordinary pulverizer is employed, a pulverized product (primary particles of carbonized charcoal) 14 having a narrow particle size distribution and a small particle size compared with the prior art MSC can be obtained by subjecting the raw material to heat oxidation treatment in the heat oxidation step S12 prior to the pulverizing treatment.

It should be noted here that according to the prior art process employing no heat oxidation treatment prior to the pulverization treatment, the particle size can be reduced to the same level as that of the present invention if pulverization over the ball mill is continued for a very long time. However, as known well in the powder engineering, it is essential to obtain a powder having a predetermined particle size distribution, but pulverization for a very long time over a ball mill gives rise to overpulverization, and thus the percentage of too small particles is increased to cause other inconveniences.

The MSC of the present invention can be obtained by subjecting the pulverized product 14 as a raw material to the same treatments as in the prior art process.

The pulverized product 14 is mixed with an ordinary binder such as kerosene, creosote, coal tar, etc. and granulated into a desired particle size in a granulating step S16. The granule 16 obtained in the granulating step S16 is subjected to carbonization in a carbonizing step S17 in an inert gas atmosphere at 400 to 700° C. within the range of 2 hours to provide a carbonized charcoal 17. The carbonized charcoal 17 obtained in the carbonizing step S17 is heat-treated in a heat treatment step S18 in an inert gas at 850 to 1200° C. within the range of 2 hours. The carbonized charcoal obtained in the heat treatment step 18 is then subjected to pore size adjustment in a pore size adjusting step S19 employing a pyrolytic hydrocarbon such as benzene, toluene, xylene, methane, ethane and propane at 500 to 900° C., preferably at 600 to 800° C. The MSC 19 of the present invention can be obtained through these steps.

Since the pulverized product 14 of the oxidized powder obtained in the pulverizing step S13 has a narrow particle size distribution and a small particle size, an MSC with high performance such as increased adsorption capacity compared with the prior art MSC can be obtained by employing the pulverized product 14 as the raw material powder.

Examples of the present invention and Comparative Examples will be described below.

EXAMPLE 1

First, 15 parts of kerosene was added to 100 parts of a phenol resin powder, and the resulting mixture was kneaded and granulated to form pellets having a diameter of 2 mm and a length of 4 mm, followed by curing of the pellets in air heated to 150° C. After the cured product thus obtained was subjected to heat oxidation treatment in air at 250° C. for 12 hours, it was pulverized over a ball mill for 4 hours. Results of particle size distribution measured for the thus pulverized product are shown in Table 1.

Comparative Example 1

The cured product as employed in Example 1 was directly pulverized over a ball mill without undergoing the heat oxidation treatment. Results of particle size distribution measured when the cured product was pulverized continuously for one hour, 4 hours and 12 hours are shown in Table 1.

TABLE 1

| Particle size range ($\mu$m) | Example 1 4 hours | Comparative Example 1 Pulverizing time | | |
|---|---|---|---|---|
| | | 1 hour | 4 hours | 12 hours |
| 1.6–2.4 | 9.0 | 0.0 | 0.2 | 1.7 |
| 2.4–3.3 | 12.4 | 0.2 | 1.2 | 2.9 |
| 3.3–4.7 | 14.2 | 0.9 | 2.6 | 5.7 |
| 4.7–6.6 | 14.5 | 1.9 | 3.9 | 7.3 |
| 6.6–9.4 | 14.3 | 7.0 | 10.2 | 11.1 |
| 9.4–13.0 | 13.9 | 12.1 | 15.1 | 13.8 |
| 13.0–19.0 | 12.7 | 19.5 | 20.0 | 17.9 |
| 19.0–27.0 | 7.8 | 22.2 | 20.2 | 17.3 |
| 27.0–38.0 | 1.0 | 17.5 | 14.1 | 13.1 |
| 38.0–53.0 | 0.2 | 12.3 | 8.8 | 7.2 |
| 53.0–75.0 | 0.0 | 6.0 | 3.6 | 2.0 |
| 75.0–106.0 | 0.0 | 0.4 | 0.2 | 0.1 |
| 106.0–150.0 | 0.0 | 0.0 | 0.0 | 0.0 |

It should be noted that "1.6–2.4" in Table 1 means 1.6 or more and less than 2.4, and the same shall apply to the others.

As shown in Table 1, it can be seen that in the case of the prior art process (Comparative Example 1) where heat oxidation treatment was not performed, a particle size of 100 $\mu$m or less was obtained by one-hour pulverization, but the particle size distribution was not changed much even when the pulverizing time was extended, and that the particle size distribution is wide. Meanwhile, it can be also understood that in the case where the heat oxidation treatment with air was applied, a particle size of 50 $\mu$m or less was obtained by 4-hour pulverization and finely divided particles of uniform grain size having minimized microparticles and crude particles, as well as, narrow particle size distribution can be obtained.

EXAMPLE 2

An MSC was prepared using the cured resin powder obtained in Example 1. First, 15 parts of a binder which is an equivalent amount mixture of creosote and tar was mixed to 100 parts of the cured resin powder, and the resulting mixture was granulated to form pellets having a diameter of 2 mm and a length of 4 mm, followed by carbonization of the pellets in nitrogen gas at 550° C. Subsequently, the thus treated pellet was heat-treated in nitrogen gas at 1000° C. for 10 minutes, followed by pore size adjustment using benzene at 700° C. for one hour to obtain an MSC.

Equilibrium adsorption capacity values of oxygen and of nitrogen in the MSC and a separation coefficient were measured to evaluate performance thereof. Incidentally, the nitrogen adsorption capacity was measured prior to the pore size adjustment treatment since it takes time to attain equilibrium after completion of the pore size adjustment treatment, while the oxygen adsorption capacity was measured after the pore size adjustment treatment. Meanwhile, with respect to the separation coefficient $\alpha$, provided that the equilibrium adsorption capacity is $q^*$, the adsorption rate formula can be expressed by $dq/dt=k(q^*-q)$. Therefore, oxygen rate constant $k(O_2)$ and nitrogen rate constant $k(N_2)$ were determined respectively to calculate the separation constant a according to the equation $\alpha=k(O_2)/k(N_2)$. The results are shown in Table 2.

Comparative Example 2

An MSC was prepared in the same manner as in Example 2 except that the cured resin powder (pulverized for 4 hours) obtained in Comparative Example 1 was employed as the raw material to evaluate performance of the MSC in the same manner as in Example 2. The results are shown in Table 2.

Comparative Example 3

An MSC was prepared in the same manner as in Example 2 except that the pellet cured at 150° C. as in Example 1 was subjected to carbonization at 550° C., without undergoing the heat oxidation treatment, and then to pulverization for 4 hours to prepare a cured resin powder which was employed as the raw material to evaluate performance of the resulting MSC in the same manner as in Example 2. The results are shown in Table 2.

EXAMPLE 3

To 100 parts of a cured phenol resin powder was mixed 15 parts of a binder which is an equivalent amount mixture of creosote and tar, and the resulting mixture was granulated to form pellets having a diameter of 2 mm and a length of 4 mm, followed by carbonization of the pellets in nitrogen gas at 550° C. for 15 minutes. The carbonized product thus obtained was subjected to heat oxidation treatment in air in the same manner as in Example 1, followed by pulverization over a ball mill for 4 hours. The procedures of Example 2 were repeated analogously to prepare an MSC, and performance thereof was evaluated. The results are shown in Table 2.

TABLE 2

|  | $N_2$ adsorption capacity (cc/g) | $O_2$ adsorption capacity (cc/g) | $O_2$ rate constant ($\times 10^{-2}$) | Separation coefficient (25° C., atm. pressure) |
| --- | --- | --- | --- | --- |
| Example 2 | 12.1 | 10.2 | 4.5 | 46.7 |
| Comparative Example 2 | 11.8 | 9.8 | 4.6 | 40.1 |

TABLE 2-continued

|  | $N_2$ adsorption capacity (cc/g) | $O_2$ adsorption capacity (cc/g) | $O_2$ rate constant ($\times 10^{-2}$) | Separation coefficient (25° C., atm. pressure) |
| --- | --- | --- | --- | --- |
| Comparative Example 3 | 11.0 | 9.1 | 4.4 | 46.1 |
| Example 3 | 11.9 | 9.9 | 4.5 | 46.3 |

As shown in Table 2, it can be seen that the MSC of Comparative Example 2 has poor performance both in oxygen adsorption capacity and separation coefficient compared with those of the MSC obtained in Example 2. Meanwhile, it can be also understood that the MSC of Comparative Example 3 having been subjected to ordinary high-temperature carbonization treatment has a separation coefficient close to that of the MSC of Example 2, but the oxygen adsorption capacity is inferior to that of the MSC of Example 2. On the other hand, the MSC of Example 3 has excellent adsorption capacity and separation coefficient compared with the prior art MSCs (Comparative Examples 2 and 3), although they may be a little inferior to those of the MSC of Example 2.

Utility in Industries

The molecular sieve carbon obtained according to the present invention is suitably employed as an adsorbent for air separation units by pressure swing adsorption method.

What is claimed is:

1. The process for producing a molecular sieve carbon whereby a thermosetting resin is heated in an ambient gas containing oxygen, comprising:
    curing a thermosetting resin to form a cured resin product;
    subjecting said cured resin product to heat oxidation in an ambient gas from 150 to 400° C. to form an oxidized product;
    pulverizing said oxidized product formed after the heat oxidation treatment to obtain a pulverized product having a particle size within the range of 1.6 to 53 $\mu$m;
    granulating said resulting pulverized product into a granule;
    subjecting said resulting granule to carbonization to form a carbonized charcoal product;
    subjecting said carbonized charcoal obtained in the carbonizing step to heat treatment; and
    adjusting the pore size of said heat-treated carbonized charcoal.

2. The process for producing a molecular sieve carbon according to claim 1, wherein the thermosetting resin is a phenol resin.

3. The process according to claim 1, wherein said thermosetting resin is a resin selected from the group consisting of phenol resin, urea resin, melamine resin, epoxy resin, urethane resin, furan resin, and an unsaturated polyester resin.

4. The process according to claim 1, wherein said pulverized product is mixed with a binder selected from the group consisting of kerosene, creosote, and coal tar in order to granulate said pulverized product into said granule.

5. The process according to claim 1, wherein carbonization is performed in an inert gas atmosphere at 400° C. to 700° C. for 2 hours or less.

6. The process according to claim 1, wherein heat treatment after carbonization is performed in an inert gas at 850° C. to 1200° C. for 2 hours or less.

7. The process according to claim 1, wherein said pore size adjustment step employs a pyrolytic hydrocarbon selected from the group consisting of benzene, toluene, xylene, methane, ethane and propane and said pore size adjustment step occurs at 500° C. to 900° C.

8. The process for producing a molecular sieve carbon whereby a thermosetting resin is heated in an ambient gas containing oxygen, comprising:

granulating a powder of cured thermosetting resin to form a granule;

subjecting said granule to dry distillation to obtain a dry distillate;

subjecting said dry distillate to heat oxidation in an ambient gas from 150 to 400° C. to form an oxidized product;

pulverizing said oxidized product formed after the heat oxidation treatment to obtain a pulverized product having a particle size within the range of 1.6 to 53 $\mu$m;

granulating said resulting pulverized product into a granule;

subjecting said resulting granule to carbonization to form a carbonized charcoal product;

subjecting said carbonized charcoal obtained in the carbonizing step to heat treatment; and adjusting the pore size of said heat-treated carbonized charcoal.

9. The process according to claim 8, wherein heat oxidation takes place directly over a fluidized bed.

10. The process for producing a molecular sieve carbon whereby a thermosetting resin is heated in an ambient gas containing oxygen, comprising:

granulating a powder of cured thermosetting resin to form a granule;

subjecting said granule to dry distillation to obtain a dry distillate;

subjecting said dry distillate to heat oxidation treatment in air from 180 to 300° C. to form an oxidized product;

pulverizing said oxidized product formed after the heat oxidation treatment to obtain a pulverized product having a particle size within the range of 1.6 to 53 $\mu$m;

granulating said resulting pulverized product into a granule;

subjecting said resulting granule to carbonization to form a carbonized charcoal product;

subjecting said carbonized charcoal obtained in the carbonizing step to heat treatment; and adjusting the pore size of said heat-treated carbonized charcoal.

* * * * *